US007688248B2

(12) United States Patent
Cross et al.

(10) Patent No.: US 7,688,248 B2
(45) Date of Patent: Mar. 30, 2010

(54) SYSTEM AND METHOD FOR 3D RADAR IMAGE RENDERING

(75) Inventors: Jack Cross, Sparks, NV (US); Theodore Bosworth, Sparks, NV (US); Craig Chapman, Sparks, NV (US); David Howard, Sparks, NV (US)

(73) Assignee: Sierra Nevada Corporation, Sparks, NV (US)

( * ) Notice: Subject to any disclaimer, the term of this patent is extended or adjusted under 35 U.S.C. 154(b) by 0 days.

(21) Appl. No.: 12/277,111

(22) Filed: Nov. 24, 2008

(65) Prior Publication Data
US 2009/0167595 A1 Jul. 2, 2009

Related U.S. Application Data

(63) Continuation of application No. 11/469,400, filed on Aug. 31, 2006, now Pat. No. 7,456,779.

(51) Int. Cl.
*G01S 7/20* (2006.01)

(52) U.S. Cl. .................. 342/25 A; 342/179; 342/180; 342/181; 342/185; 342/191; 345/419

(58) Field of Classification Search ............... 342/25 A, 342/176, 179–185, 191, 195; 345/419
See application file for complete search history.

(56) References Cited

U.S. PATENT DOCUMENTS

| 6,778,171 | B1 | 8/2004 | Kikinis |
| 6,867,774 | B1 | 3/2005 | Halmshaw et al. |
| 7,456,779 | B2 | 11/2008 | Cross et al. |
| 2006/0164417 | A1 | 7/2006 | Donovan et al. |

*Primary Examiner*—John B Sotomayor
(74) *Attorney, Agent, or Firm*—Klein, O'Neill & Singh, LLP (57) ABSTRACT

A 3D rendered image of a radar-scanned terrain surface is provided from a radar return signal from the surface, wherein the return signal includes data indicative of azimuth, elevation, and range of a radar-illuminated area of the surface. The data are processed for transformation into X, Y, and Z coordinates. The X and Y coordinates corresponding to each illuminated area are triangulated so as to create a mesh of triangles representing the terrain surface, each of the triangles in the mesh being defined by a vertex triplet. 3D imaging information (grey scale shading and/or coloring information) is added to each triangle in the mesh, based on the amplitude of the radar return signal from the coordinates represented by each vertex in the triplet and the value of the Z coordinate at each vertex, so as to form the 3D rendered image.

15 Claims, 9 Drawing Sheets

SYSTEM AND METHOD FOR 3D RADAR IMAGE RENDERING

CROSS-REFERENCE TO RELATED APPLICATIONS

The present application is a continuation of U.S. patent application Ser. No. 11/469,400 filed Aug. 31, 2006, now U.S. Pat. No. 7,456,779 entitled SYSTEM AND METHOD FOR 3D RADAR IMAGE RENDERING, the disclosure of which is hereby incorporated by reference as if set forth in full herein.

FEDERALLY SPONSORED RESEARCH AND DEVELOPMENT

Not Applicable

BACKGROUND OF THE INVENTION

The present invention relates to the field of radar imaging methods. More specifically, the present invention relates to a system and method for radar image rendering.

Enhanced vision systems are vital in the control of aircraft, especially during take off, approach, and landing in adverse conditions. Radar and Electro-Optical Infra-Red (EO/IR) systems are frequently relied upon to provide these capabilities. The effectiveness of these systems greatly depends on the quality of their imaging technology.

Imaging techniques are well known and widely used in the art. Certain imaging technologies are better suited for certain applications. For example, radar imagery is widely used for navigation, surveillance, and reconnaissance, as well as target tracking and identification.

Radar imagery is conventionally accomplished by a two-dimensional scan (range and azimuth). An image is rendered from the amplitude of the reflected signals from each resolution cell (azimuth beam width, or step by range resolution length, or range step) by assuming all returns are from a flat plane, which allows transforming from range/azimuth coordinates into a level X,Y Cartesian frame. The resulting image is a plan view with image intensity, grey scale shading, color or some combination thereof, in each basic resolution cell related to the radar return level. These images created from a top down perspective are useful in many applications, but suffer from several shortcomings when a view from a different perspective is required such as, for example, from a pilot's perspective.

Conventional radar imaging systems do not provide all three coordinate dimensions (there is no elevation angle measurement) of the location of the basic resolution cell to enable the transformation of data (i.e. the image) to another perspective. Thus, they do not present objects at the proper height in the image, from the pilot's perspective.

Some of the current state of the art radar image rendering systems use databases for vertical information. In such systems, the radar sensor location is determined by a precise navigation system, and the two-dimensional image generated, as described above, is registered in absolute coordinates, enabling the use of height data from the database. This approach suffers primarily in two respects: First, there is no capability of detecting objects with a vertical dimension not stored in the database such as construction towers erected since the database was last updated. Second, the required resolution for some applications is not available, such as is the case when a helicopter is landing in a dust cloud or fog, where a resolution on the order of one foot (30 cm) is required to assure the pilot's situational awareness.

Another shortcoming in the current state of the art in radar imaging is the irregular amplitude of returns from visually uniform surfaces due to a phenomenon known as "specular reflection." Radar imagery traditionally employs relatively only wavelengths of reflected energy (no radiated waves), causing unnatural bright and dim areas in an image of a surface that would appear uniform to the human eye. Since the human eye is accustomed to receiving both radiated and reflected energy from detected surfaces, the reconstructed radar image seems unnatural.

The current state of the art in radar imaging is unable to provide angular resolution comparable with EO/IR sensors. This lack of resolution causes a very grainy image in the azimuth dimension, which, when coupled with the specular reflection characteristics, makes human interpretation of most radar images difficult.

There is thus a need in the art for an improved system or method to provide images with better resolution and to present them from a pilot's perspective rather than the radar location.

SUMMARY OF THE INVENTION

The aforementioned need in the art is addressed by a novel three-dimensional (3D) radar image rendering system and method in accordance with the present invention. (Rendering is the process of generating an image from a model by means of a software program. In the present application, the model is the description of three-dimensional objects, while the generated image is displayed on 2D computer graphics terminal). The invention provides significant improvement in the usability of airborne radar imaging systems. The illustrated embodiment optimally blends the data acquisition method and rendering techniques to provide pilot-centered, easily interpretable radar images.

Broadly, the radar imaging system of the present invention employs a 3D radar scan (range, azimuth, and elevation) for the direct measurement of the location of a surface cell (the range of the return for each step in the angle scan), and for the direct measurement of the amplitude of the return from each cell. The availability of all three dimensions for each point allows the transformation of all data into a Cartesian frame (an X,Y horizontal plane and a Z vertical dimension). The X, Y coordinates of all cells causing returns are connected by lines forming triangles by a known triangulation algorithm, thereby creating a 3D "mesh" of triangles describing the detected surface.

Grey scale shading and/or coloring of the triangular surfaces is then added, based on the radar-determined geometry of the three vertices of each triangle (Z coordinate value or range from a selected a point, for example). The intensity of the grey scale shading or coloring is based on radar return signal amplitude. The result is a simulated or "rendered" 3D surface (on a 2D display) comprising an arrangement of colored and or shaded triangles approximating the detected surface, with each color or grey scale shading value being a function of radar return amplitude.

In some applications, it may be desired to weight the triangle color or shading based on the distance from a desired perspective, thereby to enhance depth perception and ridgeline detection. A commercially available software package is then used to transform the 3D surface to the desired perspective (e.g., the pilot's seat, looking in the direction of the fuselage reference line)

The data acquisition relies on real time scanning and measurement of the terrain to get accurate information of the topology. This scanning and measurement technique combines radar and navigational data to locate and map vertical obstacles in the target area. The employed graphic animation process allows the presenting of the reconstructed image from a desired perspective, which, in the most cases, is the pilot's perspective. Viewing a terrain from the pilot's perspective allows the easiest interpretation of the presented images. The rendering technique employed by the system further enhances usability of the system by providing life-like 3D images. The enhanced image quality is partially derived from more detailed and accurate vertical information. The result is a more natural image, thereby facilitating human interpretation.

DETAILED DESCRIPTION OF THE PREFERRED EMBODIMENTS

Figure 5:
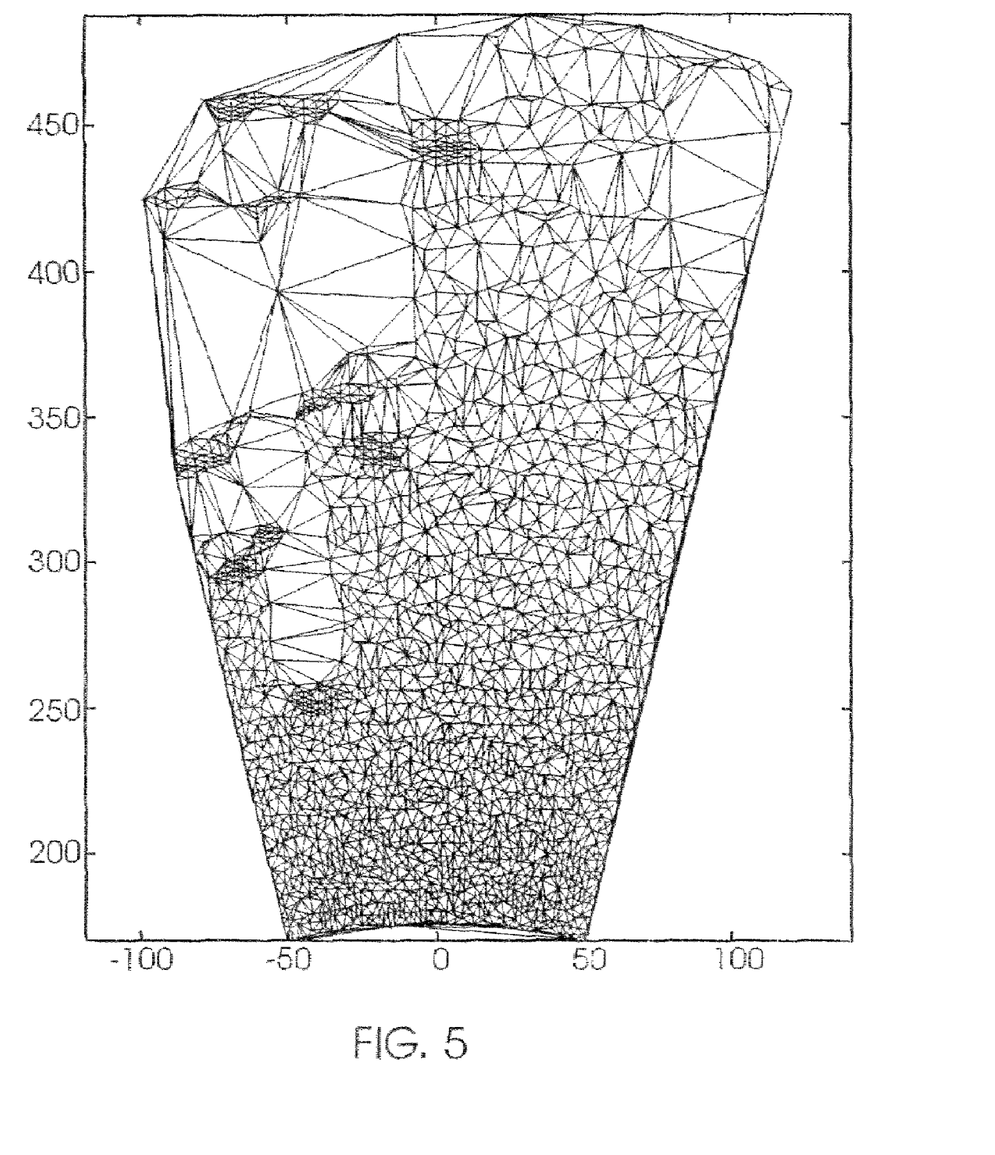
FIG. 5 shows an X, Y "mesh" of triangles formed by lines describing a detected surface.
Figure 6:
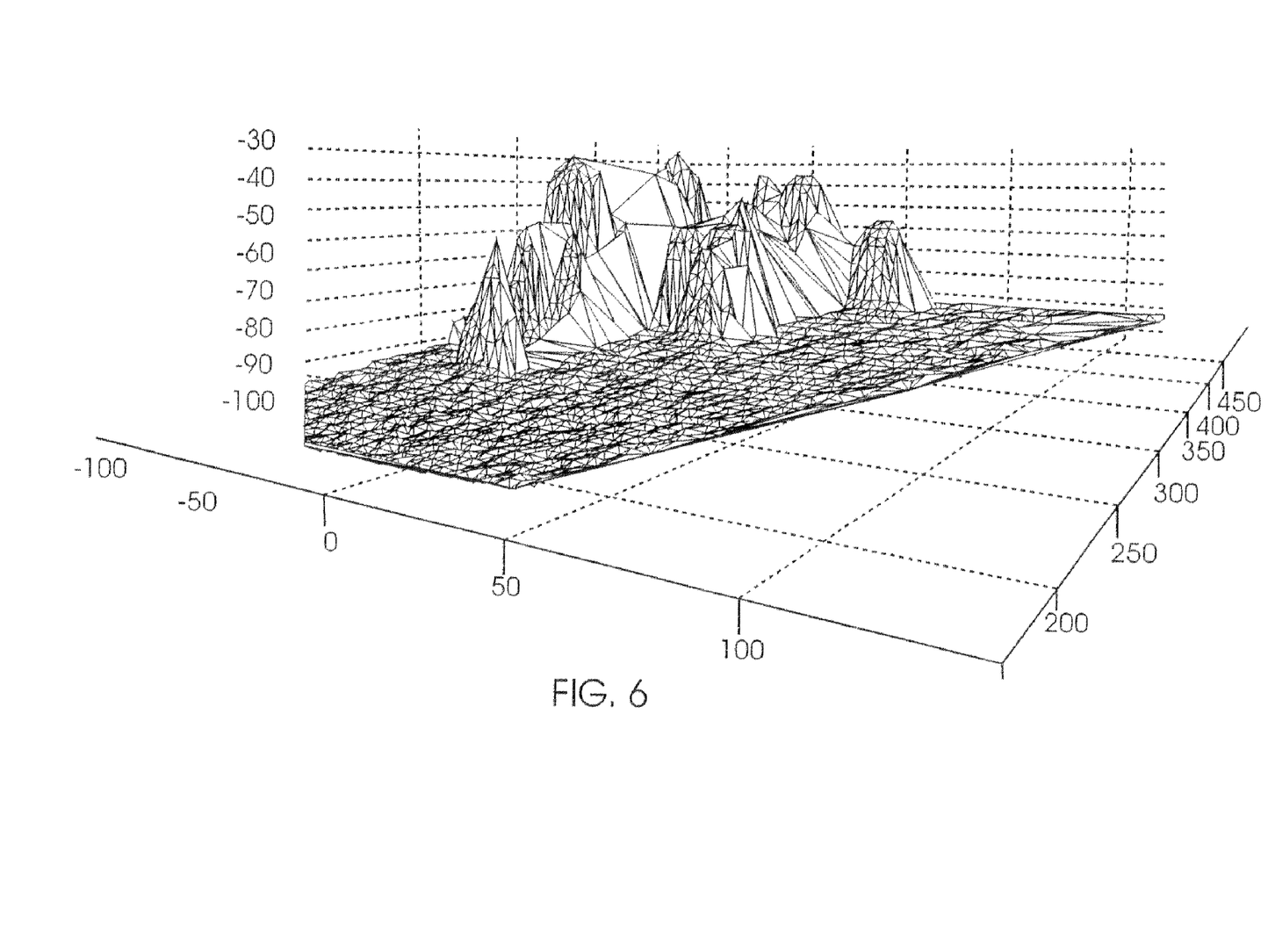
FIGS. 6 and 7 show two 3D meshes of triangles of the same surface from different perspectives.
Figure 7:
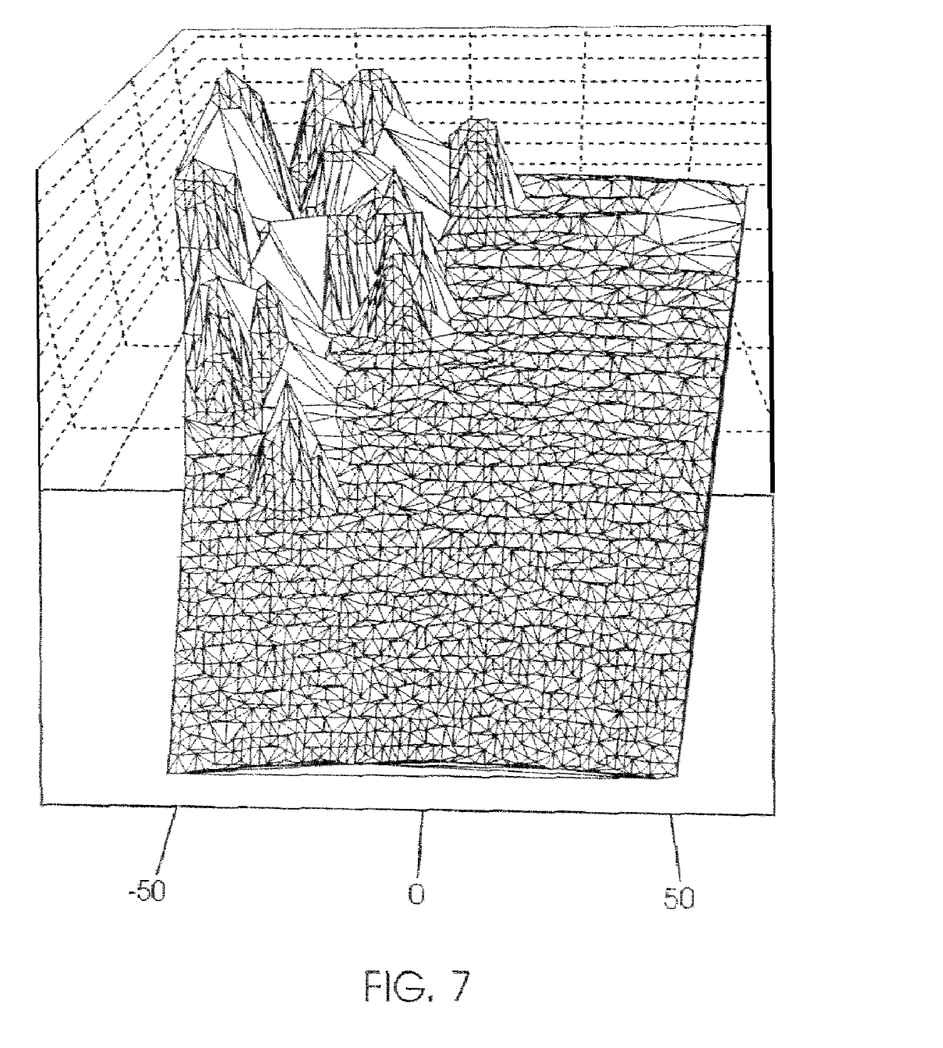
Figure 8A:
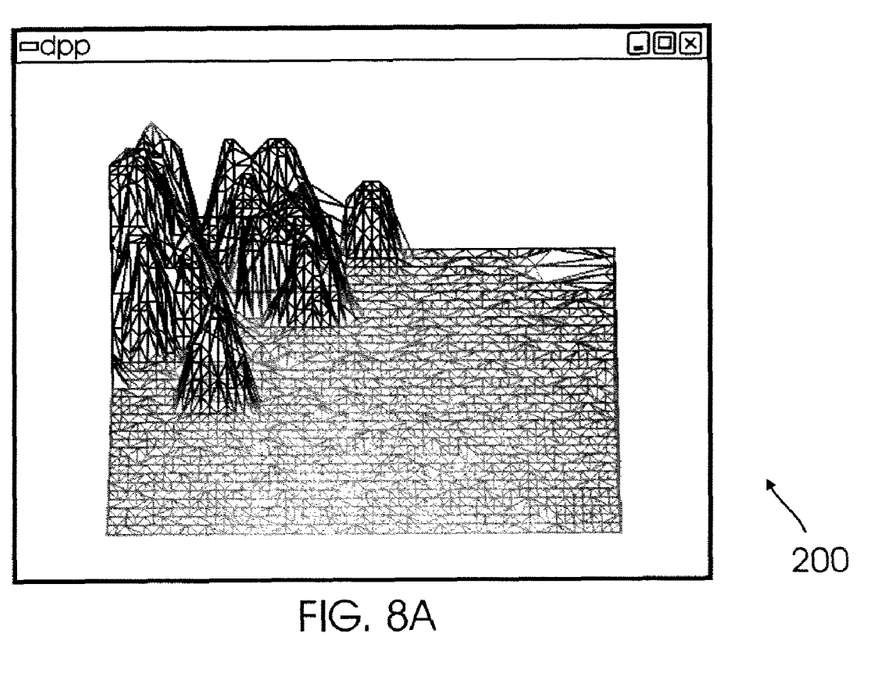
FIG. 8A shows a wireframe image of a surface on a video display.
Figure 8B:
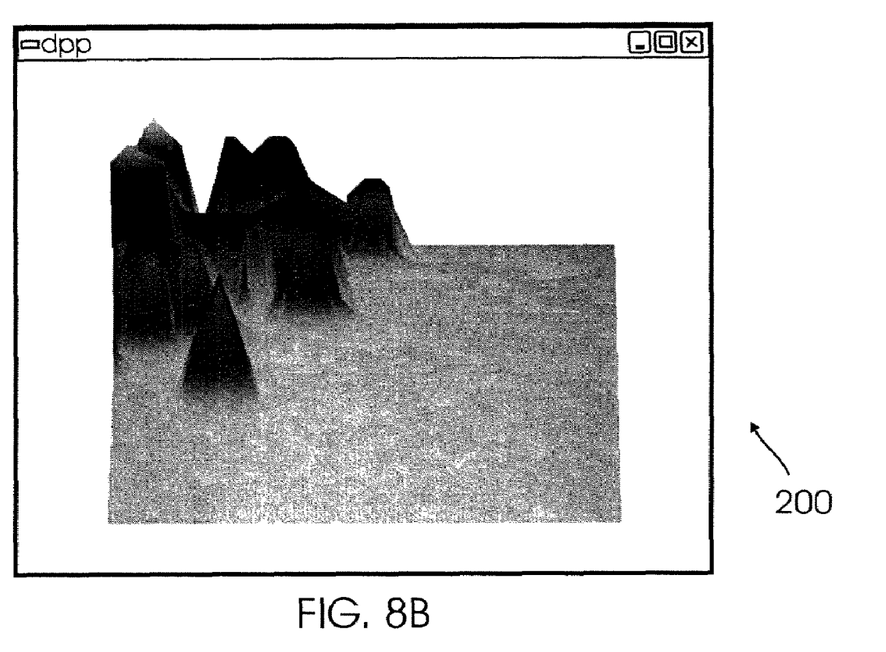
FIG. 8B shows a rendered image of the same surface as FIG. 7 with triangles filled in, based on geometry only.
Figure 8C:
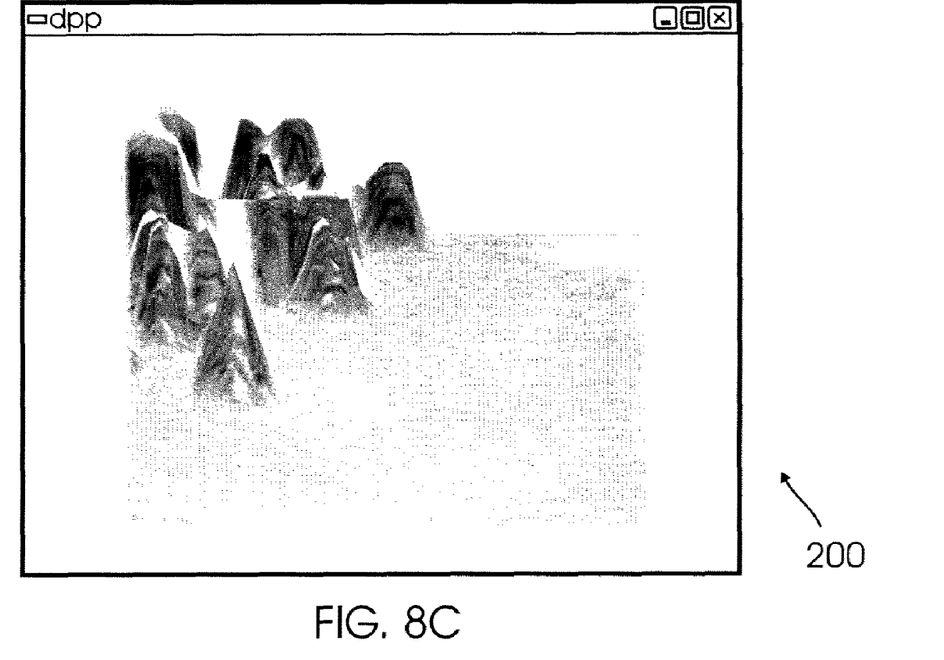
FIG. 8C shows a rendered image of the same surface as FIG. 8B with triangles filled in, based on geometry and radar amplitude.
Figure 8D:
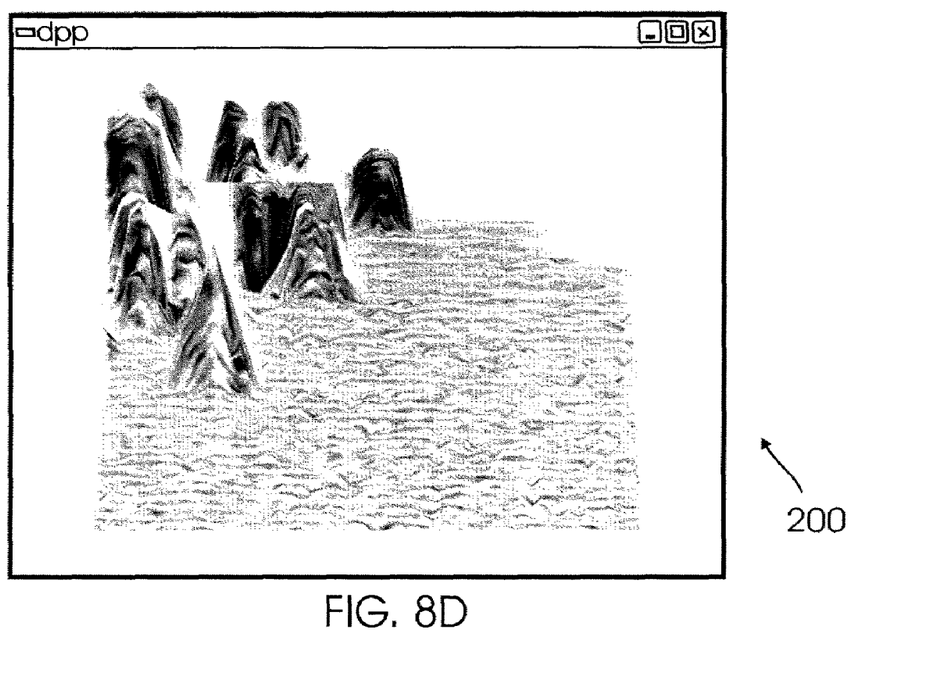
FIG. 8D shows a rendered image of same surface as FIG. 8C in monochrome

The radar imaging system described herein employs a three-dimensional (3D) radar scan having range, azimuth, and elevation data components. Data are obtained by direct measurement of a location of a surface cell range of return for each step in the angle scan, and amplitude of the return from the cell. The availability of all three dimensions for each point allows the transforming, of all data into a Cartesian frame (X, Y horizontal plane coordinates, Z vertical coordinate) The X, Y coordinates of all cells causing returns are connected by lines to form triangles, thereby creating a 3D "mesh" of triangles (using prior art techniques) that describe the detected surface, as shown in FIGS. 5-7.

As described above briefly, the detected surface model comprises an arrangement or "mesh" of contiguous triangular areas the edges of which are straight lines. By using straight lines on the display device to connect the vertices of the triangles for which the position uncertainty is derived primarily from the radar beam width, there is an apparent improvement in resolution as compared to, for example, a mosaic of overlapping circles corresponding to the radar beam width. This effect primarily influences the horizontal dimension, since range resolution effects provide improved vertical resolution.

During a rendering process, grey-scale shading or coloring of the triangular surfaces is added, based on information extracted from the 3D location of each vertex (such as height, range, slope, etc.). A conventional 2D (X, Y or horizontal image plane) radar image is also formed by projecting all return amplitudes into the image plane. The 2D return amplitude data are used to create a texture map that modulates the intensity of the triangular surface grey scale or color, thereby capturing the additional information from the multiple range resolution cells within a single triangle. The resulting image has three key characteristics: an overall (outline) shape generated from the triangles based on the radar-measured terrain geometry; the color or grey scale shading of the individual triangular areas based on parameters extracted from the position of the three vertices defining each triangle; and the intensity of the grey scale shading or the coloring of each triangle based on return radar signal amplitude. In some applications, weighting the triangle (grey-scale or color) based on distance from a desired perspective point can be used to enhance depth perception and ridgeline detection. A commercially available software package is then used to transform the 3D image to the desired perspective (e.g., from the pilot's seat, looking in the direction of the fuselage reference line).

The foregoing 3D radar image rendering method provides imagery based on real time measured elevation angles from the pilot's perspective, thereby assuring that the elevation angle appears correct in the recently created image. The vertical resolution of the radar imagery is determined by radar range resolution, as opposed to radar elevation angle resolution, with the resulting vertical positioning being based on real time direct angle measurement. The use of geometry variables from the image perspective point helps to minimize the effect of the reflected power from uniform surfaces thus facilitating the mimicking of human visualizations, which rely on radiated power as well as reflected power.

Figure 1A:
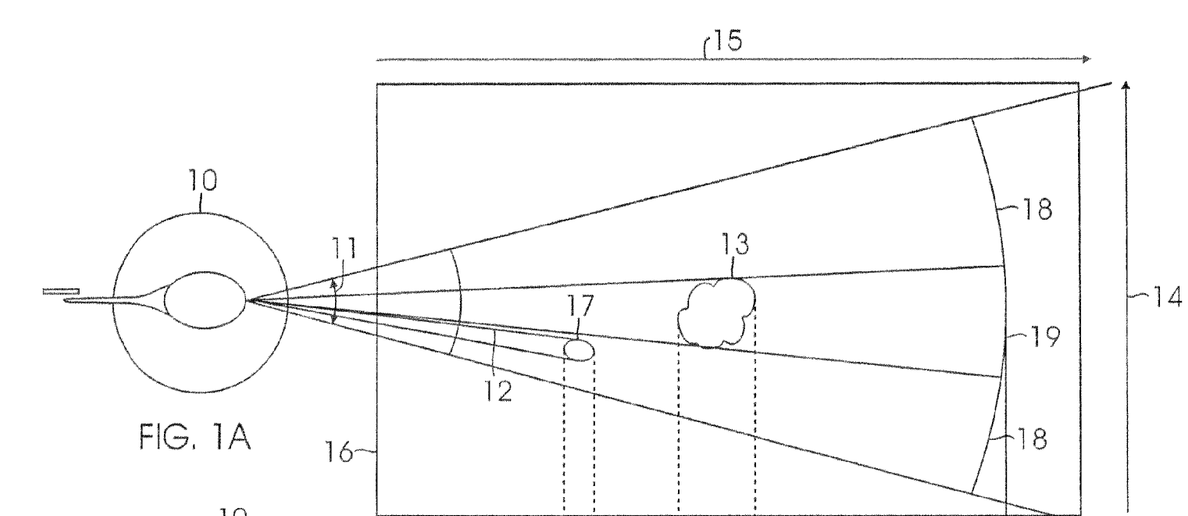
FIGS. 1A and 1B depict an aircraft equipped with a radar which scans a field of view to collect terrain data.
Figure 1B:
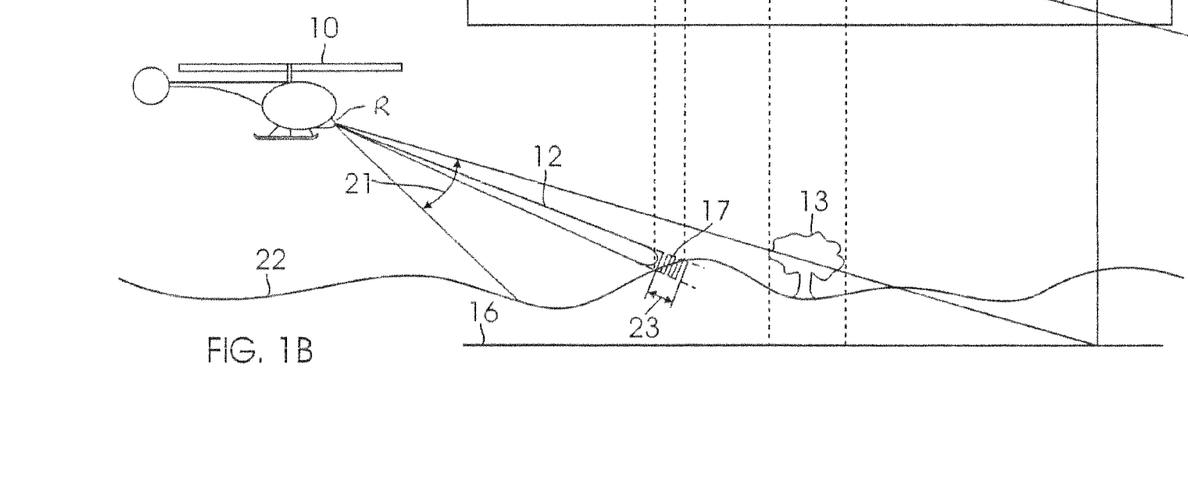
Figure 2A:
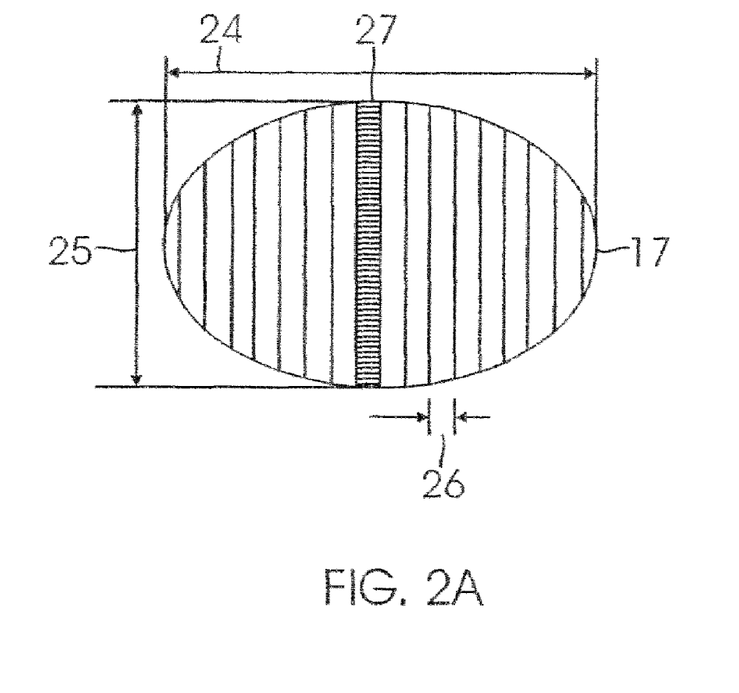
FIGS. 2A and 2B show exploded views of the region illuminated by a single step in the radar scan (one beam position)
Figure 2B:
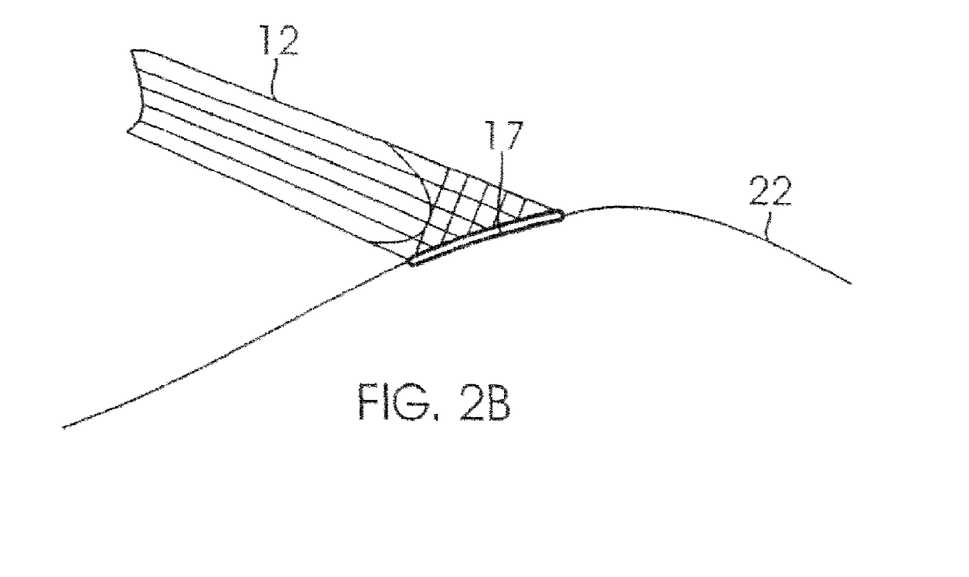

FIGS. 1A, 1B, 2A, and 2B show an operating environment of a 3D radar image rendering system. An aircraft 10 is equipped with a radar transceiver system R (FIG. 1B) that transmits a radar beam 12 that scans a field of view relative to an image plane 16 having a U-dimension 14 and a V-dimension 15. The field of view is defined by an azimuth scan angle and an elevation scan angle 21. The transmitted radar beam 12 has a beam width that is narrower than both the azimuth scan angle 11 and the elevation scan angle 21. The transceiver R receives radar return signals in a range that is proportional to the radar reflectivity of objects (such as a vertical obstacle 13 and terrain surface 22) illuminated within the beam 12 for each range resolution cell 26 (FIG. 2A) defined within an illuminated terrain area 17 having a terrain return 23 (FIGS. 1B, 2B). In FIG. 1A, the regions potentially illuminated by the beam 12 are indicated by the numeral 18, with the region shadowed by the vertical obstacle 13 being indicated by the numeral 19. In general, few range resolution cells will contain non-zero returns, because there are no objects immediately below the aircraft 10, and no returns are received at ranges greater than the range to the terrain surface 22 (no reflections from below the terrain surface 22).

FIGS. 2A and 2B show exploded views of the area 17 illuminated by a single beam position, illustrating the multiple amplitude samples at several ranges. For each antenna position, a single range to the terrain or obstacle is estimated or a single point is determined. A single point is defined by an elevation angle with an elevation resolution 24, an azimuth angle with an azimuth resolution 25, and a range estimate 27 consisting of a single selected range resolution cell 26.

Figure 3:
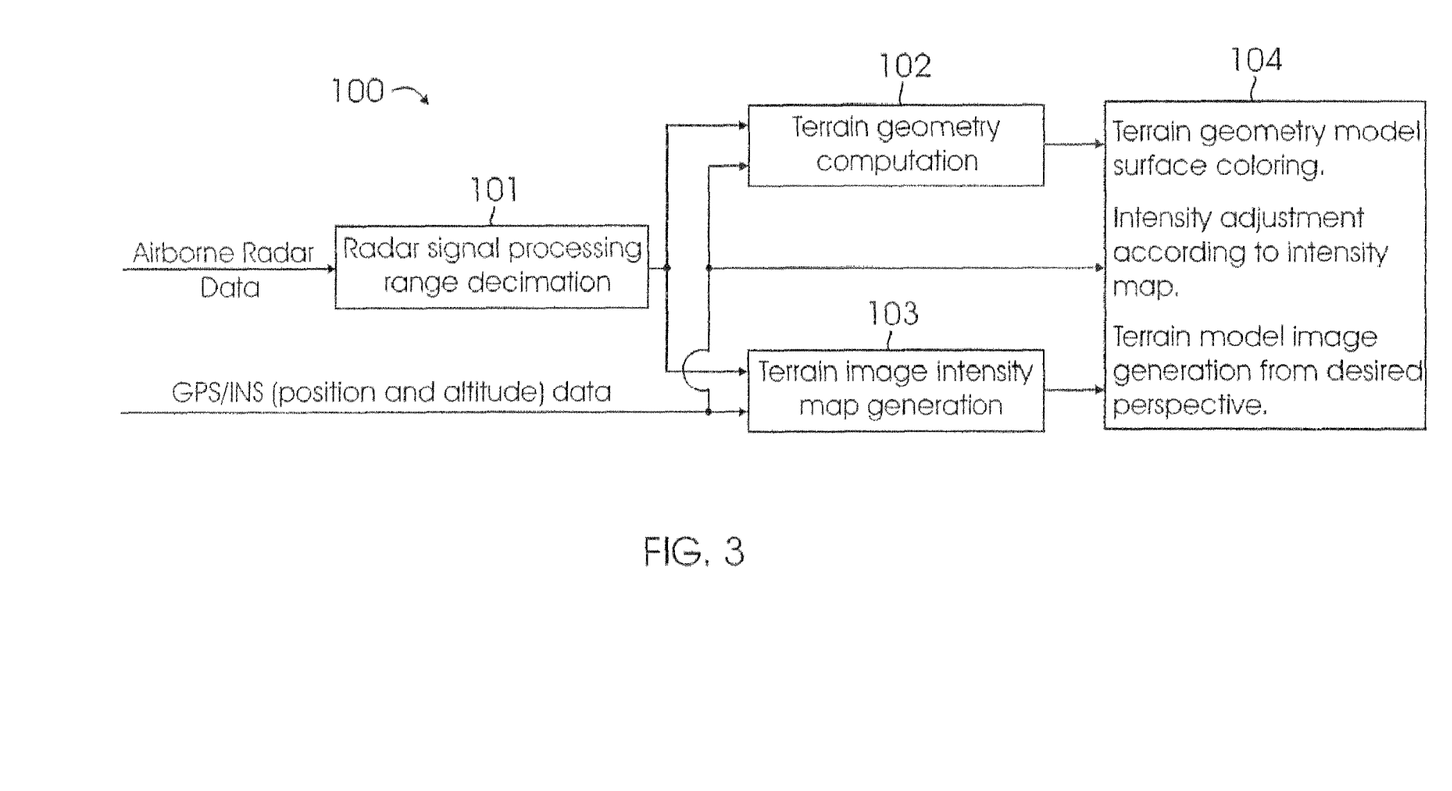
FIG. 3 is an architectural block diagram of an airborne of 3D radar image rendering system in accordance with the present invention.

FIG. 3 shows the major functional/processing modules of an image rendering system 100 in accordance with a preferred embodiment of the present invention. The rendering system 100 includes four functional subsystems: a radar signal processing subsystem 101; a terrain geometry processing subsystem 102: a terrain image processing subsystem 103: and a graphics library subsystem 104.

The radar signal processing subsystem 101 performs radar signal processing and data reduction. This processing involves frequency diversity employed to reduce the variation in return signal amplitude from a uniform surface, the selection of large amplitude return signals, and range decimation to reduce the quantity of data. The raw radar return signal amplitudes from transmissions made at different frequencies are first averaged over a time period equal to the time the antenna beam position dwells in one angular step, and the resultant averaged return in each range resolution cell is processed to ignore those range bins containing negligible return amplitudes. The data are further compressed by combining amplitudes over multiple range bins under low grazing angle conditions (long range and low elevation angles). This operation is referred to as range decimation. The decimated averaged range samples are applied to the terrain geometry processing subsystem 102 and the terrain image processing subsystem 103.

The terrain geometry processing subsystem 102 calculates terrain geometry. The terrain geometry processing subsystem 102 generates two basic outputs: a 3D mesh of triangles characterizing the terrain surface topology within the radar field of view; and a list of obstacles (points) detected above the terrain surface.

The radar data is input as amplitude versus time for each angle step (azimuth and elevation) in the raster scan of the field of view. Ignoring noise and returns through antenna side lobes, for each angle step, where the terrain is illuminated by the radar beam, non-zero returns will be received over a range interval. For beam directions not pointing towards the ground (i.e., the terrain surface 22), no ground return is received, but returns from obstacles (e.g. the vertical obstacle 13) above the terrain surface may be received. The coordinates of each terrain surface point detected during the scan period are defined in a level plane to enable the graphics tool to apply texturing, and a "vertex list," comprising the coordinates of each detected point and an associated ID number, is constructed. Each resolution cell within the level plane can have only one terrain point (overhanging cliffs and the like are ignored). The lowest point above the level plane detected is declared a terrain point, and any other points with higher elevation values are declared obstacle points and entered on an "Obstacle list". Entries in the vertex list (terrain points) are input to a triangulation algorithm, which operates on the horizontal coordinates of the points by forming triangles using the well-known principles of "Delaunay" or "Delauney" triangulation. The output of the triangulation algorithm is a list of triples from the vertex list identifying the three vertices of each triangle.

The terrain image processing subsystem 103 generates terrain image intensity maps, The terrain image path generates a 3D radar image based on the amplitude of radar returns.

The graphics library subsystem 104 is a commercially available graphics library software package, such as, for example, the OpenGL interactive 3D and 3D graphics application programming interface available from Seaweed Systems, Inc. of Burlington, Mass. (www.seaweed.com). It accepts a 3D mesh of triangles defining a surface geometry (the triangle and vertex lists) color and/or grey scale values for the vertices (the information extracted from the 3D location of each vertex), a texture map defining intensities for the triangular areas (the 3D amplitude-based texture map), and a position and look direction, defining an image perspective. The graphics library 104 takes these inputs typically at the rate of one per second. Then it colors or shades the terrain geometry model surfaces by blending or smoothing the vertex values across the triangular surface area, and it adjusts display intensity per the intensity map (variations in both color or grey scale and intensity within each triangular facet). Intensity is based on radar return signal amplitude. In addition, points and or other shapes can be added anywhere in the image, a feature that is used to add obstacles (radar returns above the terrain surface) to the terrain image. The created terrain model image is presented from the desired perspective, typically the pilot reference position. The output image is updated at, typically, tens of Hz to provide a current image from the moving platform.

The functions of the above-described functional subsystems 101-104 are implemented by several sub-function modules. The algorithms to implement each sub-function are not described, as they may be conventional algorithms that would be easily determined or devised by those of ordinary skill in the art. Accordingly, only the sub-functions provided by the algorithms are identified by their respective modules. Each of the sub-functions is performed with a predetermined repetition rate. These rates are:

$r_1$ where the rate is defined by $c/\delta R$ for pulsed radar (where "c" is speed of light and "$\delta R$" is the range resolution of the radar);

$r_2$ where the rate is determined by the repetition period of the pulsed radar or the dwell time for frequency modulated continuous wave radar;

$r_3$ where the rate is determined by the averaging update interval (several $r_2$ periods);

$r_4$ where the rate is the volume scan rate; and $r_5$ where the rate is determined the display update rate.

Figure 4:
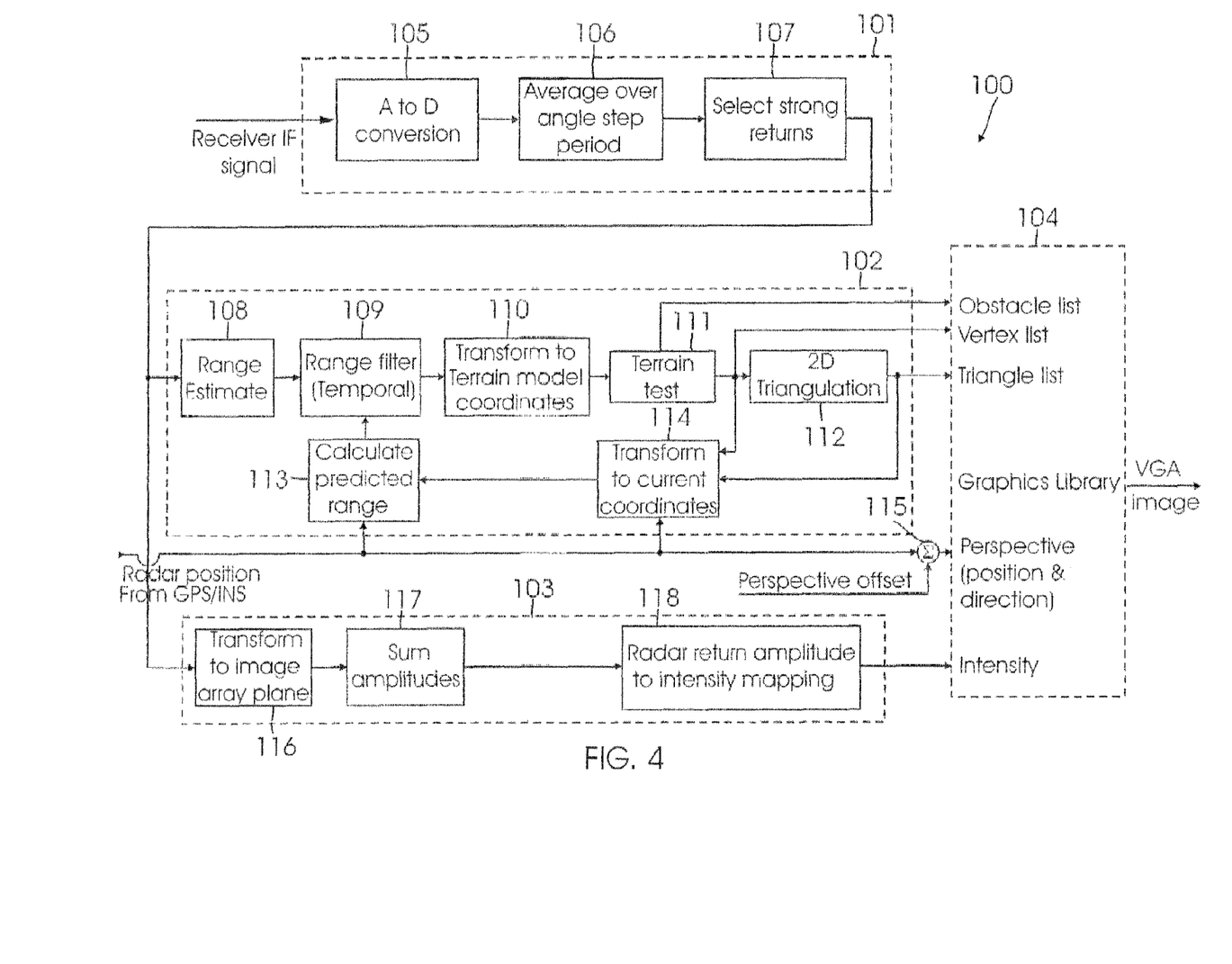
FIG. 4 is a flow diagram showing major functional processing blocks of an airborne 3D radar image rendering system in accordance with the present invention.

Referring to FIG. 4, the radar signal processing function 101 includes an analog-to-digital conversion module 105, a data averaging module 106, and a signal selection module 107. The conversion module 105 converts the analog radar data to digital form for further processing. The processing rate is $r_1$. The data averaging module 106 receives the digitized radar data from the conversion module 105 and it performs data averaging of each angle step period. Averaging returns from individual resolution cells allows use of returns from differing radar frequencies (frequency diversity), which has the effect of reducing the variation in return amplitude from different areas of a uniform object. This method more closely replicates the passive energy collected by the human eye in forming an image. Averaging also compresses the number of data samples that must be processed, thereby reducing data rates and processor loading. Range decimation, described above, further reduces data rates and processor loading. The processing rate of this calculation is $r_2$. The signal selection module 107 selects the strongest return signal for further processing. The processing rate of this calculation is $r_3$.

The terrain geometry processing function 102 includes several sub-function modules, the first of which is a range estimation module 108 that performs range-to-terrain estimate calculations from the radar data received from the radar signal processing function 101 for each angle step, where the terrain is illuminated by the radar beam. The processing rate of this calculation is $r_3$.

A range filter module 109 combines estimated range values and predicted range values to arrive at the range, azimuth, and elevation coordinates of the point on the terrain surface toward which the radar beam is currently pointed. The estimated range data are obtained from the range estimation module 108, while the predicted range values are obtained from a predicted range module 113, described below. The processing rate of the range filter module 109 is $r_3$.

A transform to terrain model coordinates module 110 takes the radar data (azimuth, elevation, range), the aircraft position (latitude, longitude, altitude) and the aircraft attitude (heading, pitch, roll) and computes the three dimension X, Y, Z position in a terrain model coordinate system. This also includes projecting the X, Y, Z position coordinates onto the image plane to compute the texture map U, V "coordinates". (The U, V "coordinates" are standard, normalized values allowing the graphics library 104 to register correctly the texture map onto the terrain surface.) The processing rate of this calculation is $r_3$.

A terrain test module 111 scans the set of 3D points to segregate a subset of points defining a geometric terrain (no points overhanging any other points)—the vertex list—from other points—the obstacle list—. The obstacle list is converted into a set of points and or shapes for input to the graphics library 104. The terrain test module 111 outputs the list of vertices and the obstacle data to the graphics library 104.

Referring again to FIG. 2A, the expanded view of the region illuminated by a single beam position illustrates that for practical radar parameters, the range resolution provides much better resolution than does the resolution imposed by either the azimuth or elevation antenna beams. Modulating the intensity of the terrain geometry model by mapping the texture map derived from radar amplitude data onto the surfaces provides a computationally efficient mechanism to retain the significant improvement in vertical resolution provided by the range resolution as opposed to that provided by the elevation beam width The multiple range cells within each bean position can be thought of as a means to interpolate within a single elevation beam sample. FIG. 2B shoves the region where the main beam intercepts the ground. The fine lines within the antenna beam width represent the improvement in vertical resolution. The processing rate of this calculation is $r_4$.

Referring again to FIG. 4, a 3D triangulation module 112 is a real-time implementation of an algorithm published in the open literature and well-known to those of ordinary skill in the pertinent arts. A suitable example is described in "A Sweepline Algorithm for Voronoi Diagrams."*Algoritihmica*, Vol. 2 pp. 153-174 (1987), the disclosure of which is incorporated herein by reference. The triangulation module 112 accepts declared terrain points as input from the terrain test module 111, and it operates on the horizontal coordinates of the points by connecting adjacent points to form triangles. The output of the processing is a list of triples from the vertex list identifying the three corners of each triangle. The processing rate of this calculation is $r_4$.

The predicted range module 113 calculates the predicted range by combining the current Position, supplied by a navigation system (such as GPS/INS), with the last terrain model provided by a coordinate transformation module 114. The processing rate of this calculation is $r_3$. The coordinate transformation module 114 provides coordinate transformations on the terrain geometry model in earth-fixed coordinates received from the terrain test module 111 (vertex list) and the triangulation module 112 (vertex triples or triangle list). The predicted range module 113 accepts the earlier terrain model information in current coordinates and calculates a predicted range used to refine the current range estimate, The processing rate of this calculation is $r_4$.

A summing module 115 adds a perspective offset to position data supplied by the GPS/INS navigation system to represent actual position.

The terrain image intensity function 103 includes an image transformation module 116, an amplitude-summing module 117, and an intensity-mapping module 118. The image transformation module 116 trans forms the location of each radar return from the moving radar coordinate system to the earth-fixed frame, and projects (via the summing module 117) all data into a horizontal area in the earth-fixed coordinate system (the image frame). The processing rate of this calculation is $r_3$.

The intensity mapping module 118 forms the texture map used by the graphics, The illuminated area 17 of the image plane 16 (FIGS. 1A and 1B), illuminated by the current radar scan, is divided into $2^n$ by $2^m$ bins. The radar return signal amplitudes of all returns above each bin are summed and projected into a single bin. The processing rates for the amplitude-summing module 117 and the intensity mapping module 118 are $r_3$ and $r_4$, respectively.

The graphics module 104 performs the actual image rendering as described briefly above. The inputs defining the terrain include the 3D mesh of triangles (vertex and triangle lists) with associated values for color or grey scale for each vertex, and a texture map defining intensity. Obstacle inputs can be in the form of points or another independent pair of vertex/triangle lists, causing 3D surfaces to be drawn above the terrain surface (akin to hanging sheets of paper oriented perpendicular to the look direction). All image perspective is defined by a location and the look direction. During a rendering process, grey-scale shading or coloring of the triangular surfaces is added by blending the values assigned to the vertices across each triangular area with the intensity being derived from the radar return signal amplitude. The result is a 3D surface consisting of triangles approximating the detected surface, where the grey-scale or color within each triangle varies to match values calculated for the three vertices based on vertex height or another geometrical relationship (e.g., range from the image perspective) and the intensity varies with the amplitude of the radar return signal. In some applications, weighting the triangle (grey-scale or color) based on distance from a desired perspective point can be used to enhance depth perception and ridgeline detection The graphics module 104 is used to transform the 2D image to the desired perspective (e.g., from the pilot's seat, looking in the direction of the fuselage reference line). FIGS. 8A-8D illustrate the results of the rendering process, as displayed on a video display screen 200 in the aircraft 10.

The foregoing 3D radar image rendering system provides imagery based on real time measured elevation angles from the pilot's perspective thereby assuring that the elevation angle appears correct in the recently created image. The vertical resolution of the radar imagery is determined by radar range resolution as opposed to radar elevation angle resolution with the resulting vertical positioning being based on real time direct angle measurement.

The use of geometry elevation, and range from the image perspective point in addition to radar return helps to minimize the variation in the reflected power levels from uniform surfaces. This geometry data is used to make up for the missing radiated power from radar data and thus facilitates better human visualizations which relies on both radiated power and reflected power. Furthermore the present invention improves image resolution, realized by drawing sides of the triangles between points on the reflecting surface, as opposed to the use of fixed-size angular pixels related to radar antenna beam width.

What is claimed is:

1. A method of creating an image using radar return signals, comprising:
   generating a mesh representation of a surface using radar return signals, the mesh representation having vertices defining position information in three dimensions;
   creating a texture map for the mesh representation using information of amplitudes of the radar return signals;
   rendering an image of the surface from a desired perspective point using the mesh representation and the texture map; and
   displaying the image.

2. The method of claim 1 wherein the vertices define triangles in the mesh representation.

3. The method of claim 2 further comprising determining color information for at least some of the triangles based on at least some of the position information of the vertices defining the at least some of the triangles.

4. The method of claim 3 further comprising weighting the color information for the at least some of the triangles based on distance of the at least some of the triangles from the desired perspective point.

5. The method of claim 4 wherein the radar return signals include radar return signals from transmissions made at different frequencies.

6. The method of claim 4 further comprising averaging the amplitudes of the radar return signals from transmissions made at different frequencies and combining amplitudes over multiple range bins to form decimated averaged range samples, and wherein creating the texture map for the mesh representation using information of amplitudes of radar return signals comprises creating the texture map for the mesh representation using decimated averaged range samples.

7. The method of claim 1 wherein the radar retain signals are received by a radar transceiver system of an aircraft.

8. The method of claim 7 wherein the desired perspective point is that of a pilot of the aircraft.

9. The method of claim 1 further comprising updating the image at tens of cycles per second.

10. The method of claim 1 wherein the desired perspective point is determined by an inertial navigation system.

11. The method of claim 1 wherein the desired perspective point is determined by a global positioning system.

12. A method of forming an image of terrain for display in an aircraft, comprising:
   receiving radar return signals;
   creating a mesh representation of the terrain using information of the radar return signals, the 3D mesh representation including a plurality of triangles defined by vertices, each of the vertices having associated position information in three dimensions;
   determining intensity of the triangles based on information of amplitudes of the radar return signals; and
   receiving information of a position and a look direction; and
   forming an image of the terrain using the mesh representation, the intensity of the triangles, and the position and the look direction.

13. The method of claim 12 wherein the radar return signals are radar return signals from transmissions made at different frequencies.

14. The method of claim 13 wherein the information of amplitudes of the radar return signals comprises decimated averaged radar return signals.

15. The method of claim 12 wherein the position is determined by a navigation system.

* * * * *

UNITED STATES PATENT AND TRADEMARK OFFICE
CERTIFICATE OF CORRECTION

PATENT NO. : 7688,248 B2  
APPLICATION NO. : 12/277111  
DATED : March 30, 2010  
INVENTOR(S) : Cross et al.

Page 1 of 1

It is certified that error appears in the above-identified patent and that said Letters Patent is hereby corrected as shown below:

In column 4, line 45, delete "scan angle and" and insert -- scan angle 11 and --, therefor.

In column 10, line 1, delete "retain" and insert -- return --, therefor.

Signed and Sealed this

Seventeenth Day of August, 2010

David J. Kappos  
*Director of the United States Patent and Trademark Office*